United States Patent [19]

Vander Syde

[11] Patent Number: 4,884,795
[45] Date of Patent: Dec. 5, 1989

[54] DOCUMENT FEEDER APPARATUS

[75] Inventor: Gary Vander Syde, Naperville, Ill.

[73] Assignee: Bell & Howell Company, Chicago, Ill.

[21] Appl. No.: 199,371

[22] Filed: May 26, 1988

[51] Int. Cl.$^4$ ............................................. B65H 3/04
[52] U.S. Cl. .................................... 271/34; 271/146; 271/149; 271/179
[58] Field of Search ...................... 271/150, 149, 30.1, 271/31.1, 179, 146, 34

[56] References Cited

U.S. PATENT DOCUMENTS

| | | | |
|---|---|---|---|
| 3,682,473 | 8/1972 | Kuyt | 271/149 X |
| 3,995,851 | 12/1976 | Casper | 271/179 |
| 4,252,308 | 2/1981 | Templeton | 271/179 |
| 4,295,645 | 10/1981 | Nahar | 271/149 X |
| 4,299,379 | 11/1981 | Preston | 271/149 X |
| 4,328,962 | 5/1982 | Akers | 271/12 |
| 4,432,540 | 2/1984 | Akers | 271/179 X |
| 4,595,188 | 6/1986 | Wiley | 271/4 |
| 4,621,798 | 11/1986 | Akers | 271/31.1 X |

Primary Examiner—Richard A. Schacher
Attorney, Agent, or Firm—Laff, Whitesel, Conte & Saret

[57] ABSTRACT

The invention provides an improved auger conveyor in the magazine section of a document feeder apparatus which is capable of feeding large amounts of documents to a document sorting machine in a rapid and efficient manner. The auger conveyor includes: three horizontal augers which rotate in a clockwise direction; spiral grooves formed on the horizontal augers and divided in half by the existence of two separate pitches; joggers on the surfaces of the wider pitched portions of the two inner horizontal augers which facilitate reception of documents within the grooves; a raised auger which rotates in a counterclockwise direction; and a spiral groove configured in the direction opposite to the grooves on the horizontal augers and which also is divided in half by the existence of two separate pitches; and a document feed or pickoff apparatus for individually separating the lead document from the document supply. The improved auger conveyor efficiently conveys the documents in the proper orientation while assuring that they are separated from one another for individual processing.

18 Claims, 1 Drawing Sheet

U.S. Patent
Dec. 5, 1989
4,884,795
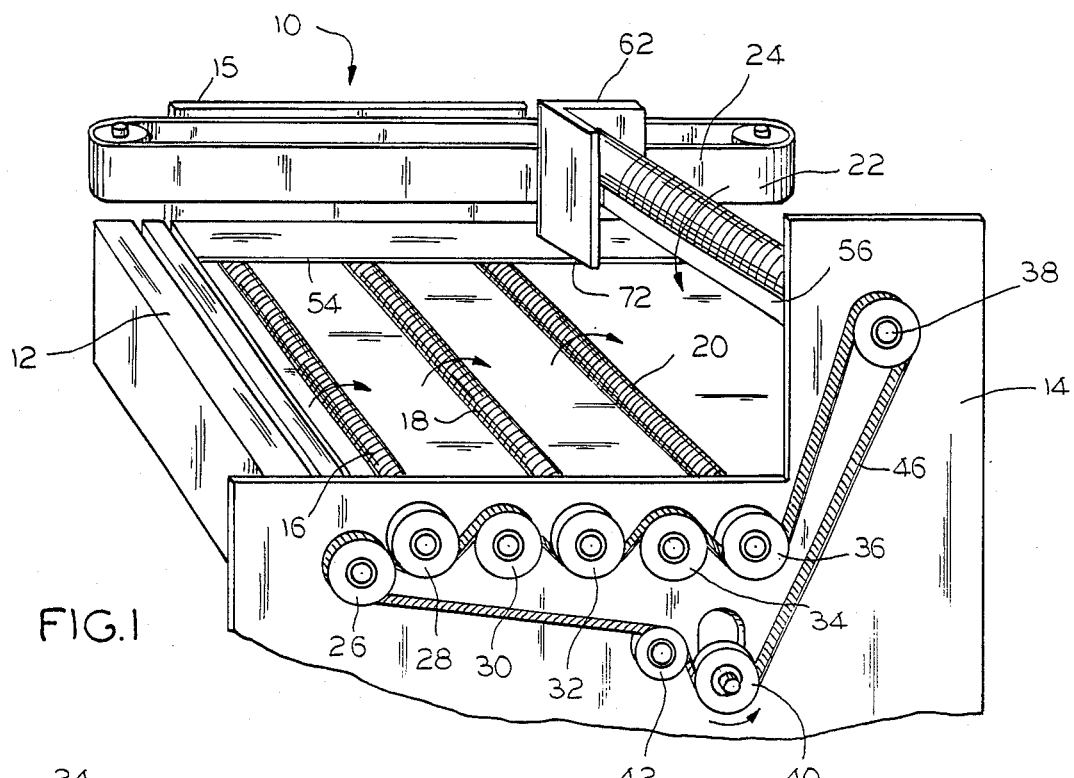
FIG.1
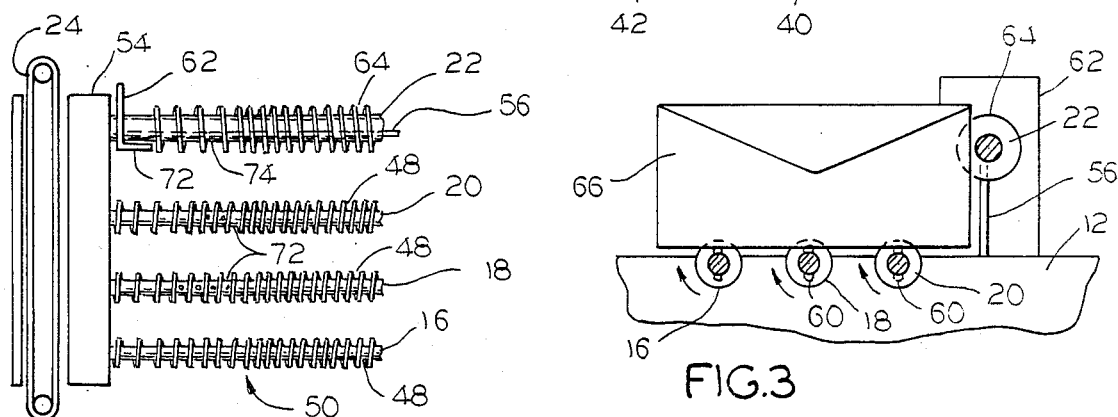
FIG.2
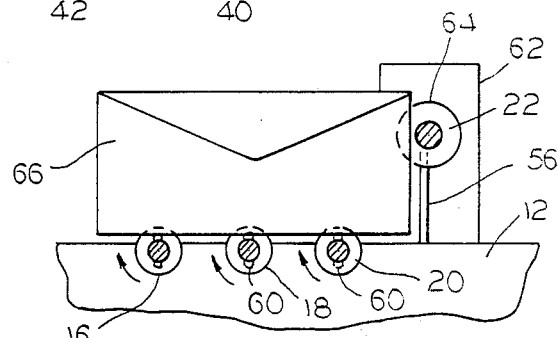
FIG.3
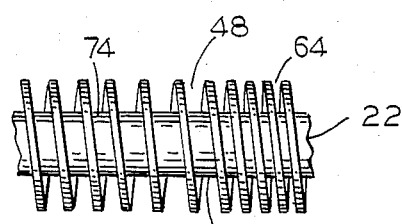
FIG.4
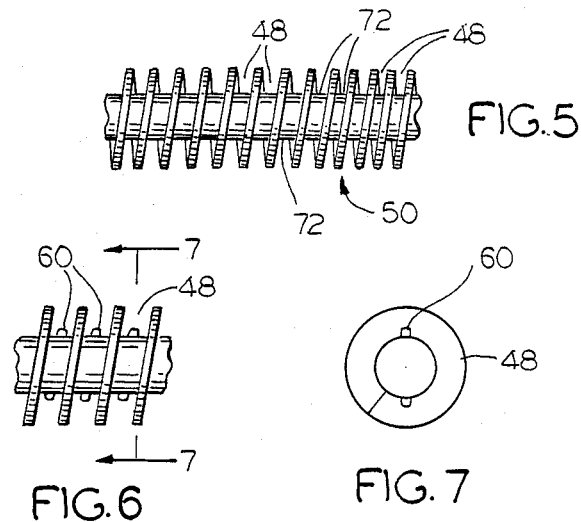
FIG.5
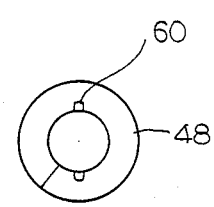
FIG.6
FIG.7

DOCUMENT FEEDER APPARATUS

BACKGROUND AND SUMMARY OF THE INVENTION

This invention relates in general to a high speed document transport apparatus and, in particular, to an improved augered document feeder apparatus for use with document singulation machines.

Several types of mail sorting machines exist which attempt to efficiently sort the large volumes of mail that are sent and received each day by various businesses, institutions, governmental units and other entities which handle large amounts of mail. Two major problems associated with high speed document sorting machines are assuring that the documents are properly separated from one another prior to sorting for individual handling subsequent to sorting and assuring that the documents are stable and not jostling when being fed into the singulation system which feeds the documents into the document sorting machine. If two or more documents stick together and are advanced together through the machine rather than individually, they are deposited incorrectly in the same sorting bin. Additionally, if the documents are not oriented properly to be picked off at the singulation station, the documents can be damaged.

One type of high speed document transport apparatus that has been successful is shown by U.S. Pat. No. 4,432,540 of Akers, which is commonly assigned to the present assignee. This type of machine includes a screw or auger conveyor which is placed within the magazine section of the machine and includes a pick off envelope feed station at the end of the auger conveyor for separating the individual envelopes in a stack from one another. The screw conveyor of Akers includes four driven rollers having spiral grooves for receiving the lower edges of the envelopes to convey them along the rollers as the rollers rotate. A pair of raised rollers with spiral grooves contacts a vertical edge of each envelope and maintains the envelopes in a vertical orientation as they are conveyed along the lower rollers. The pick off feed station includes a conveyor belt and a relatively strong vacuum box which draws the leading envelope against the belt. The belt then advances each envelope singly from the stack. An opposing vacuum box of lesser intensity draws any stuck envelopes away from the leading envelope to assure separation. The opposing vacuum box has a beveled surface which effects a staggered shingle arrangement of any extra envelopes adhering to the leading envelope.

Although this type of machine has been favorably received, it has not been 100% efficient. One of the problems is that the documents do not always rest stable in the horizontal and vertical directions. In order for the vacuum belts to properly separate the individual documents from the document supply, the feeding system must be able to accommodate different styles, sizes and thicknesses of documents. For example, if relatively thin envelopes are being sorted, there is a tendency for the envelopes to bunch tightly together and thus adhere to one another at the pickoff station. This tightly bunched condition of the envelopes often results in double feeding and other mispicking problems. Conversely, if the envelopes are not held together tightly enough, as tends to occur when thick documents are being handled, similar picking problems arise and the production capability of the machine also suffers.

The present invention is directed to a document feeder apparatus with an improved screw or auger conveyor to assure that the documents are transported to the document sorting machine at the proper rate and with proper orientation. In accordance with the present invention, the magazine section of the document feeder apparatus is equipped with three horizontal augers and an additional counter-rotating auger raised above the magazine section for conveying the documents to the feed station. The horizontal augers, as well as the raised auger, have two different groove pitches along their lengthwise dimensions; the pitch increases about halfway of the travel path of the documents to reduce the bunching of the documents lodged atop the auger grooves. The change in pitch of the augers provides additional separation and assures that the documents are not bunched together as they are advanced toward the feed station.

Two of the inner horizontal augers have external protrusions disposed at the root of adjacent threaded portions, the protrusions located about 180 degrees apart to jog the documents and aid in the separation process. In addition, the grooves of the raised auger are tapered in the opposite direction of the tapers of the horizontal augers and the raised auger rotates counter-clockwise whereas the horizontal augers rotate clockwise as viewed from the rearward end of the magazine section. This provides a combined forward and downward force on the documents to provide proper alignment of the documents as they are transported to the document feed and sorting apparatus at the end of the feed tray. The invention includes a pickoff device comprising a belt that frictionally pulls the individual documents into the document sorting machine. The overall result is that the individual documents are effectively separated from the document supply and do not stick together as they are advanced through the machine and eventually deposited in a sorting bin.

DESCRIPTION OF THE DRAWINGS

In the accompanying drawings which form a part of the specification and are to be read in conjunction therewith and in which like reference numerals are used to indicate like parts in the various views;

FIG. 1 is a perspective view of a document feeder apparatus constructed according to a preferred embodiment of the present invention with the arrows indicating the preferred rotation of the grooves of the augers and sprockets;

FIG. 2 is a fragmentary top plan view of the augers of the apparatus of FIG. 1 illustrating arrangements of the grooves of the augers;

FIG. 3 is a fragmentary side elevation sectional view of the apparatus of FIG. 1 showing a document engaged in the grooves of the augers;

FIG. 4 is a fragmentary elevational view of the raised auger of the apparatus of FIG. 1 illustrating the two different pitches of the raised auger;

FIG. 5 is a fragmentary elevational view of one of the horizontal augers of the apparatus of FIG. 1 illustrating the two different pitches of the horizontal augers;

FIG. 6 is a fragmentary elevation view of one of the horizontal augers illustrating joggers; and FIG. 7 is a sectional view of the auger of FIG. 6 taken along the line 7—7.

DETAILED DESCRIPTION OF THE INVENTION

Referring to FIG. 1, numeral 10 is used to designate a document transport apparatus which is constructed in accordance with a preferred embodiment of the present invention. Document transport apparatus 10 includes a feeder magazine 12. Attached to the frame of feeder magazine 12 are side frame members 14, 15.

In accordance with the present invention, magazine 12 is provided with an improved auger conveyor systems for advancing the documents from the loading end of the magazine to pick off band or feed station 24 which in the illustrated embodiment is a belt that picks off and advances individual documents for sorting. The auger conveyor includes preferably three horizontal augers 16, 18, 20 and raised auger 22 which is parallel to horizontal augers 16, 18, 20 but raised axially above the horizontal augers. Augers 16, 18, 20 are mounted between side members 14 and 15 for rotation in the magazine 12 and extend lengthwise therein in the magazine. The ends of augers 16, 18, 20 which are opposite to band 24 extend through side frame member 14, and have sprockets 28, 32, 34, respectively attached to the ends of the augers, as illustrated in FIG. 1. The opposite ends of augers 16, 18, 20 are journaled to side frame member 15 of magazine 12. The rotational axes of augers 16, 18, 20 are located in a common horizontal plane.

Each horizontal auger 16, 18, 20 comprises a continuous spiral groove 48 formed in its exterior surface extending lengthwise as illustrated in FIGS. 2, 5, and 6. The grooves 48 extend from the rearward end of the augers to approximately three to four inches from the feed band 24. At this point, augers 16, 18, and 20 extend beneath a flat plate 54, which is adapted to provide a flat, non-augered surface across which the documents move just prior to reaching belt 24.

As best shown in FIG. 5, the pitch of the grooves of each auger changes near the middle 50 of magazine 12; the rearward portion of augers 16, 18, 20 have a constant pitch which is smaller than the constant pitch of the forward portion of the augers. By way of example, the rearward pitch of augers 16, 18, 20 may be four threads to the inch, while the pitch of the forward portion may be two threads to the inch. The pitch change relieves document pressure which results from the bouncing of documents within the grooves, thus allowing the documents to more readily rest on the surfaces 72 of the augers.

As seen in FIG. 6, within the grooves 48 on surfaces 72 between the threads forming grooves 48 of the two inner horizontal augers 18, 20 are joggers 60 which comprise stubs or protrusions dispersed along the lengths of the two augers and which jostle documents up and down to facilitate vertical settling of the documents as horizontal pressure is relieved by the jogging.

Raised auger 22 is located to one side of auger 20 and is parallel to auger 20, but is elevated about three inches above auger 20 as shown in FIG. 1. The rearward end of raised auger 22 is mounted for rotation on side member 14 and is driven in a counter-clockwise direction as shown in FIG. 1 by sprocket 38. The other end of the raised auger is journaled on a block 62 supported on magazine 12. Block 62 is spaced from feed station 24 to allow the documents to pass unimpeded between block 62 and the feed station as they are removed from the stack.

Raised auger 22 includes continuous a spiral groove 64 (FIGS. 2, 4) which extends lengthwise across the entire length of the auger. The spiral of auger 22, however, is in a direction opposite to the spirals of augers 16, 18, and 20 as illustrated in FIGS. 2 and 4. Additionally, spiral groove 64 also has two separate pitches. The pitch constant which extends from the rearward end of the auger 22 to the middle 50 (FIG. 2) of the augers is smaller than the constant pitch which extends forward from that point to block 62. A plate 56 extends vertically from the base of magazine 12 to just below raised auger 22, and slightly forward of the center line of raised auger 22. This plate 56 prevents the documents from contacting the shaft 74 comprising auger 22, while allowing the documents to be located between the spiral groove.

As best shown in FIG. 1, the rotation of augers 16, 18, 20 and raised auger 22 is caused by motor driven sprocket 40, drive sprockets 28, 32, 36 and 38 idle sprockets 26, 30 and 34, and driving belt 46. Driving belt 46 is preferably an endless timing belt or chain or the like which is drawn tightly around and between the sprockets. The arrangement of the belt and sprockets is clearly illustrated in FIG. 1, wherein it is evident that augers 16, 18 and 20 are driven clockwise such that a document resting on top of these augers is driven rearward toward and against auger 22. Likewise, auger 22 is driven counterclockwise such that the documents are simultaneously driven downward as auger 22 engages the forward lateral edge of each document.

The document feeder apparatus of the present invention operates as follows: The electric motor (not shown) which drives sprocket 40 is activated thus causing rotation of sprockets 26, 28, 30, 32, 34, 36, 38, 40, 42 as well as augers 16, 18, 20 and raised auger 22 in the directions indicated by the arrows in FIG. 1. A bundle of documents 66 (FIG. 2) of varying sizes, shapes and thicknesses to be sorted are dropped on the rearward or rightward quarter of the magazine 12, as viewed in FIGS. 1, 2. Each spiral groove may partially embrace the edges of one or more documents. The rotation of spiral grooves 48 of augers 16, 18, 20 effects movement of the documents 66 rearward and against raised auger 22 and vertical plate 56, where the lateral leading edges of the documents are driven into engagement with spiral grooves 64 of auger 22. As the documents 66 travel due to the rotation of the augers, the documents are jostled and their bottom edges tend to fall within spiral grooves 48, and at the same time, the vertical edges of the documents tend to be received within spiral grooves 64 of raised auger 22.

As the documents travel along the magazine within spiral grooves 48 and 64 as the augers 16, 18, 20 and 22 rotate, several documents may remain bunched together within the grooves and may not be resting on the surfaces 72 of augers 16, 18, 20 and against surface 74 of raised auger 22. The pitches of the grooves 48 and 64, however, change as shown in FIGS. 2, 4, and 5 to relieve the pressure of those documents within the grooves, and allow any misoriented documents to rest snug against the surface 72 of the augers 16, 18 and 20. This pitch change occurs at the approximate midpoint 50 of the magazine 12. Joggers 60, disposed 180 degrees apart on shaft 72 of augers 18 and 20 in the wider pitched grooves jostle the documents 66 slightly to further ensure that the documents are separated one from another and are ready to be fed one at a time from the stack.

The documents continue to travel down magazine 12, until they reach flat plate 54 and sidewall 72 of block 62. At this point, documents 66 are not within any grooves and the horizontal edges rest against the flat plate 54 and the vertical edges rest against sidewall 72. Thereafter, the documents are moved forwardly by the pressure of other documents 66 as they advance behind the forward documents. As each document is pushed forward and is put in contact with singulator belt 24, the belt 24 frictionally grips the lead document and transports it rapidly into the document sorting machine. The process continues document by document until either the document feeding is complete or the electric motor driving sprocket 40 is deactivated.

It is thus apparent that the present invention provides an improved auger conveyor in the magazine portion of an apparatus which is capable of feeding large amounts of documents to a singulation document sorting machine in a rapid and efficient manner. The auger conveyor includes: three horizontal augers which rotate in a clockwise direction; spiral grooves formed on the horizontal augers and divided approximately in half by the existence of two separate pitches; joggers on the surfaces of the two inner horizontal augers which facilitate reception of and slightly jostle documents positioned within the grooves; a raised auger which rotates in a counterclockwise direction and includes a spiral groove configured in a direction opposite to the spiral configuration of the grooves on the horizontal augers and which also is divided approximately in half by the existence of two separate pitches; and a document pick-off means for individually separating the lead document from the document supply. The improved auger conveyor efficiently conveys the documents in the proper orientation while assuring that they are separated from one another for individual processing.

Still other embodiments of the principles of this invention are contemplated, and the appended claims are intended to cover such other embodiments as are within the spirit and scope of this invention.

I claim:

1. In a document feeder apparatus for receiving a supply of documents and delivering the documents to a feed station at which the documents are separated individually from the document supply, and improved conveyor comprising:
   a plurality of first auger means mounted on a magazine section of the conveyor and adapted for rotation about substantially parallel axes located in a common horizontal plane;
   a continuous spiral groove on each of said first auger means having two different sized pitches, the larger pitch being located nearer the feed station, said grooves adapted to receive the lower edges of the documents and being arranged to convey the documents along said horizontal plane toward the feed station of the conveyor in response to rotation of said first auger means;
   at least one raised second auger means mounted on the magazine section of the conveyor and adapted for rotation about an axis oriented generally paralled to the rotational axis of said first auger means, said raised second auger means being elevated relative to said common horizontal plane at a location to engage a vertical edge of each document located on said first auger means;
   a continuous spiral groove on said second auger means with two different sized pitches, the larger pitch being located nearer the feed station, said groove on said second auger means adapted to receive said vertical edge of the documents to assist in conveying the documents and maintaining the vertical orientation thereof in response to rotation of said second auger means;
   drive means for effecting rotation of said first and second auger means to convey the documents along the magazine section to the feed station of the conveyor;
   means disposed at said feed station for transporting the documents one at a time from said supply of documents; and
   a plurality of joggers included within the continuous spiral groove of the first auger means which is located closest to the second augers means, said joggers affixed at the base of said groove.

2. The invention described in claim 1 wherein said drive means rotates said first auger means in a direction opposite to that of said second auger means.

3. The invention described in claim 2 wherein said first auger means rotates clockwise as viewed from a rearward end of the magazine section and said second auger means rotates counter-clockwise.

4. The invention described in claim 1 wherein said drive means is comprised of:
   power means operable to effect rotation of said first and second auger means;
   powered sprocket means on the rearward side of said magazine section and driven by said power means;
   auger sprocket means on the rearward end of each of said augers;
   idle sprocket means between the auger sprockets located on said first auger means;
   two additional idle sprocket means located on the rearward side of said magazine section between said auger sprocket means located on the horizontal auger and siad powered sprocket means; and
   an endless belt operatively connected to all of said sprocket means and adapted to cause rotation of each of said sprocket means upon rotation of said powered sprocket means, thereby causing rotation of said first and second auger means.

5. The invention described in claim 4 wherein said drive means rotates said first auger means in a direction opposite to that of said second auger means.

6. The invention described in claim 5 wherein said first auger means rotates in the clockwise direction as viewed from the rearward end of the magazine section.

7. The invention described in claim 1 wherein said continuous spiral grooves on said first auger means are spiraled in a direction opposite to the direction in which said continuous spiral groove on said second auger means is spiraled.

8. The invention described in claim 7 wherein said continuous spiral grooves on said first auger means extend from the rearward end of said first auger means to a point at the forward end of said first auger means, and flat plate means covering a portion of said first auger means adjacent said forward end.

9. The invention described in claim 7 wherein the first auger means closest to the second auger means include joggers within several continuous spiral grooves at the base of said grooves.

10. The invention described in claim 7 wherein said joggers comprise small external protrusions located every 180 degrees throughout the several continuous spiral grooves.

11. The invention described in claim 7 wherein said horizontal augers rotate in a direction opposite to that of said raised augers.

12. The invention described in claim 11 wherein said first auger means rotates clockwise as viewed from the rearward end of the magazine section.

13. The invention described in claim 7 wherein said several continuous spiral grooves are those having the larger sized pitch of said continuous spiral groove of said first auger means closest to said second auger means.

14. In a document feeder apparatus for receiving a supply of documents and delivering the documents to a feed station at which the documents are separated individually from the document supply, an improved conveyor comprising:

a plurality of first auger means mounted on a magazine section of the conveyor and adopted for rotation about substantially parallel axes located in a common horizontal plane;

a continuous spiral groove on each of said first auger means adapted to receive the lower edges of the documents and arranged to convey the documents along said horizontal plane toward the feed station of the conveyor in response to rotation of said first auger means;

at least one raised second auger means mounted on the magazine section of the conveyor and adapted for rotation about an axis oriented generally parallel to the rotational axis of said first auger means, said second auger means being elevated relative to said common horizontal plane at a location to engage a vertical edge of each document located on said first auger means;

a continuous spiral groove on said second auger means adapted to receive said vertical edge of the documents to assist in conveying the documents and maintaining the vertical orientation thereof in response to rotation of said second auger means;

drive means for effecting rotation of said first and second auger means to convey the documents along the magazine section to the feed station of the conveyor; and means disposed at said feed station for transporting the documents one at a time from said supply of documents; the first auger means closest to said second auger means including joggers within several continuous spiral grooves at the base of said grooves, whereby said joggers jostle and separate documents as said first auger means rotates and said joggers contact said documents disposed in said grooves.

15. The invention described in claim 14 wherein said joggers comprise small external protrusions located every 180 degrees throughout the several continuous spiral grooves of said first auger means.

16. The invention described in claim 14 wherein said spiral grooves of each of said first and second auger means have two different sized pitches along the length of each auger means, the larger pitch of each groove being located nearer the feed station, said joggers disposed at the base of only said grooves of said larger pitch of said first auger means.

17. The invention described in claim 14 wherein said first auger means comprises three auger shafts having said spiral grooves extending along the length thereof, said joggers disposed at the base of the grooves of only the two auger shafts closest said second auger means.

18. The invention described in claim 16 wherein said first auger means comprises three auger shafts having said spiral grooves extending along the length thereof, said joggers disposed at the base of said larger pitch grooves of only the two auger shafts closest to said second auger means.

* * * * *